# (12) United States Patent
Gage et al.

(10) Patent No.: US 7,394,622 B2
(45) Date of Patent: Jul. 1, 2008

(54) MAGNETIC RECORDING MEDIA WITH DISCRETE TRACKS OF MAGNETIC MATERIAL IN A MAGNETICALLY SOFT UNDERLAYER

(75) Inventors: Edward Charles Gage, Mars, PA (US); Gary Clark Rauch, Pleasanton, CA (US); Rene Johannes Marinus van de Veerdonk, Wexford, PA (US); Hans Juergen Richter, Palo Alto, CA (US); Terry Wayne McDaniel, Volcano, CA (US); Mark H. Kryder, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 597 days.

(21) Appl. No.: 11/005,819

(22) Filed: Dec. 7, 2004

(65) Prior Publication Data

US 2006/0121318 A1 Jun. 8, 2006

(51) Int. Cl.
*G11B 5/82* (2006.01)
(52) U.S. Cl. ........................ 360/135; 360/133
(58) Field of Classification Search .......... 360/131–136
See application file for complete search history.

(56) References Cited

U.S. PATENT DOCUMENTS

| 5,399,372 | A | | 3/1995 | Grimes et al. |
|---|---|---|---|---|
| 5,995,309 | A | | 11/1999 | Suzuki et al. |
| 6,014,296 | A | * | 1/2000 | Ichihara et al. ............. 360/135 |
| 6,440,520 | B1 | * | 8/2002 | Baglin et al. ............. 428/847.7 |
| 6,510,015 | B2 | * | 1/2003 | Sacks et al. ................... 360/75 |
| 6,703,099 | B2 | | 3/2004 | Belser |
| 6,706,358 | B1 | | 3/2004 | McDaniel et al. |
| 6,709,773 | B1 | | 3/2004 | Chang et al. |
| 2002/0037439 | A1 | | 3/2002 | Litvinov et al. |
| 2002/0058159 | A1 | | 5/2002 | Kubota et al. |
| 2002/0071214 | A1 | | 6/2002 | Belser |
| 2006/0141141 | A1 | * | 6/2006 | Kamata et al. ............. 427/128 |
| 2006/0226116 | A1 | * | 10/2006 | Haginoya et al. ............. 216/41 |

OTHER PUBLICATIONS

Y. Soeno et al., "Feasibility of Discrete Track Perpendicular Media For High Track Density Recording," *IEEE Transactions on Magnetics*, vol. 39, No. 4, Jul. 2003, pp. 1967-1971, Jul. 2003.
Z. G. Zhang et al., "FePt (001) Texture Development on an Fe-Ta-C Magnetic Soft Underlayer With SiO$_2$/MgO as an Intermediate Layer," *Applied Physics Letters*, vol. 83, No. 9, Sep. 1, 2003, pp. 1785-1787.

* cited by examiner

*Primary Examiner*—A. J. Heinz
(74) *Attorney, Agent, or Firm*—Robert P. Lenart, Esq.; Pietragallo Gordon Alfano Bosick & Raspanti, LLP (57) ABSTRACT

A magnetic recording medium comprises a magnetically soft underlayer having a plurality of cavities in a surface thereof, and a magnetic recording material in the cavities, wherein a surface of the magnetic recording material in the cavities is substantially coplanar with the surface of the soft underlayer. A recording system that includes the recording medium is also included.

22 Claims, 8 Drawing Sheets

MAGNETIC RECORDING MEDIA WITH DISCRETE TRACKS OF MAGNETIC MATERIAL IN A MAGNETICALLY SOFT UNDERLAYER

FIELD OF THE INVENTION

This invention relates to magnetic storage media and more particularly to such media having discrete recording tracks.

BACKGROUND OF THE INVENTION

The concept of using discrete track magnetic media to increase areal density or increase component tolerances has received much attention recently. Claimed benefits are a signal to noise ratio (SNR) increase of 0.2 to 3 dB due to a wider read area and reduced track edge noise, and a reader width tolerance that is increased by >100%. Several types of discrete track media (DTM) architectures have been previously modeled and/or fabricated including: (1) topographically defined (spacing loss); (2) selective etch or deposition defined (using a discontinuous recording layer); and (3) selective disordering defined (which alters the magnetic properties of the recording layer).

Although the analysis is far from complete, the benefits from most of the current DTM architectures seem too small to justify the increased media cost and the system impacts. DTM can be used for perpendicular recording, wherein the direction of magnetization in the media is perpendicular to the plane of the media. An issue facing perpendicular recording is the spreading of the magnetic write field beyond the desired recording zones. This causes adjacent track erasures unless the field is contained using recording head side shields. Unfortunately these side shields steal flux from the recording zone.

There is a need for an improved discrete track media that has the benefits of conventional DTM, while addressing some of the manufacturability and tribology concerns, and alleviating the need for side shields in the recording head.

SUMMARY OF THE INVENTION

This invention provides a magnetic recording medium comprising a magnetically soft underlayer having a plurality of cavities in a surface thereof, and a magnetic recording material in the cavities, wherein a surface of the magnetic recording material in the cavities is substantially coplanar with the surface of the soft underlayer.

In another aspect, the invention encompasses a magnetic recording system comprising a motor for rotating a storage medium, and an arm for positioning a recording head adjacent to the storage medium, with the storage medium including a magnetically soft underlayer having a plurality of cavities in a surface thereof, and a magnetic recording material in the cavities, wherein a surface of the magnetic recording material in the cavities is substantially coplanar with the surface of the soft underlayer.

DETAILED DESCRIPTION OF THE INVENTION

Figure 1:
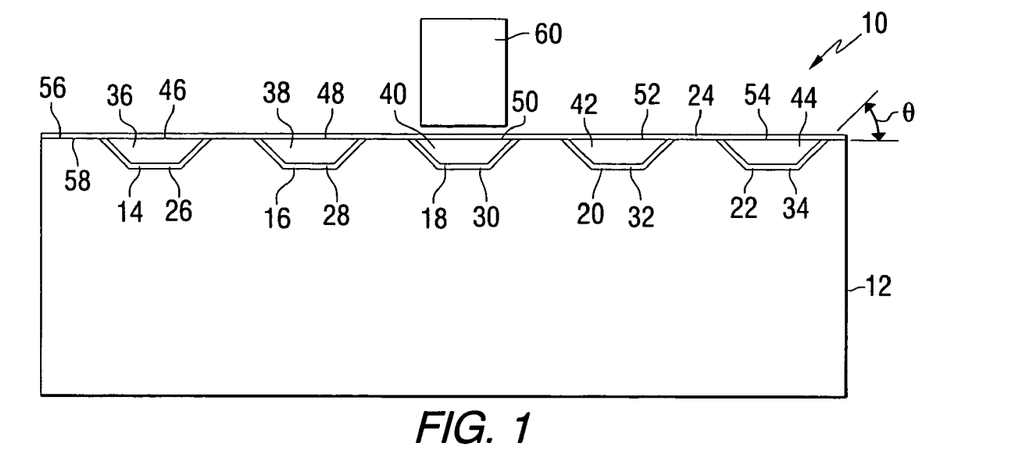
FIG. 1 is a radial cross section of a portion of a magnetic recording disc constructed in accordance with the invention.
Figure 2A:
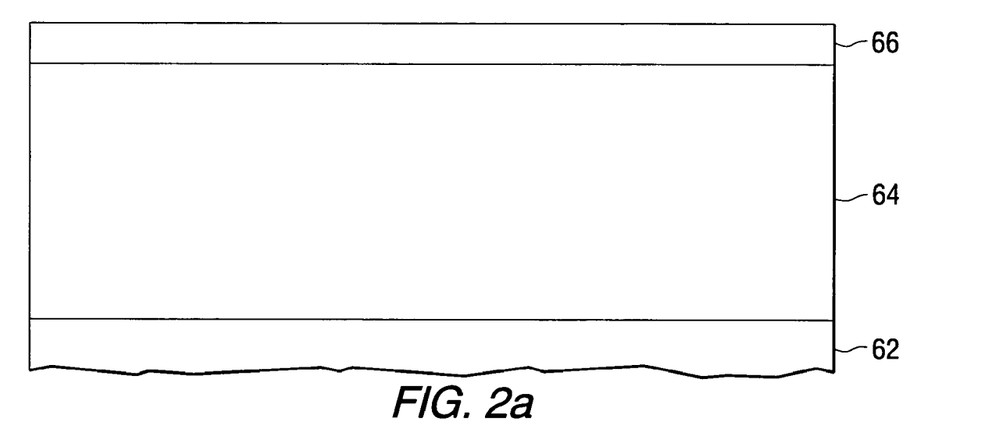
FIGS. 2a through 2e illustrate intermediate structures in the fabrication of a magnetic recording disc constructed in accordance with the invention.
Figure 2B:
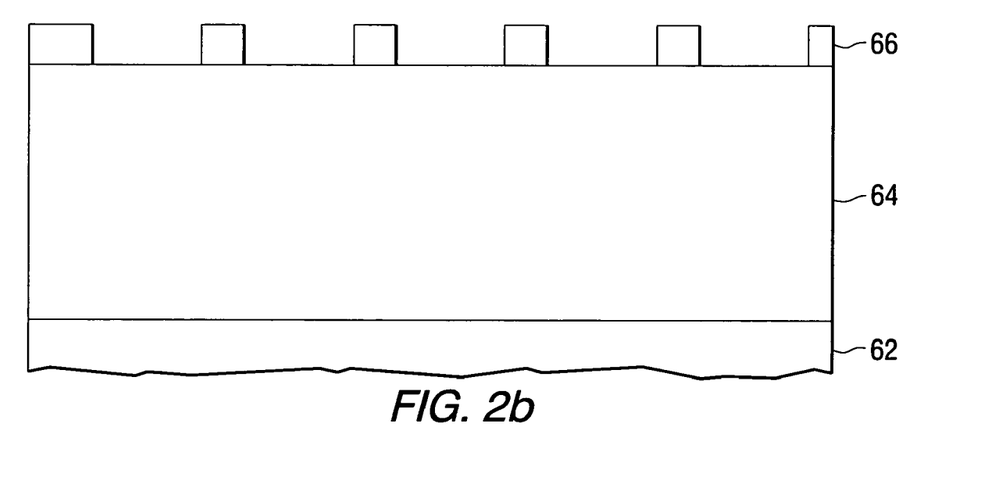
Figure 2C:
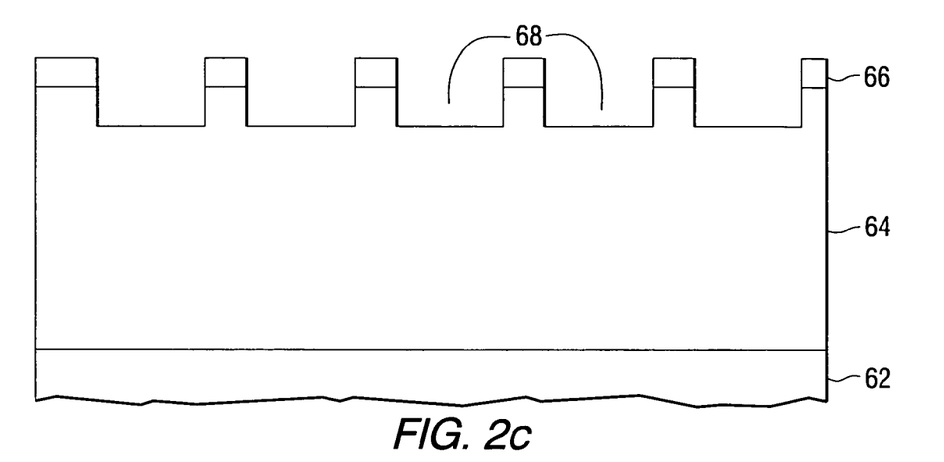
Figure 2D:
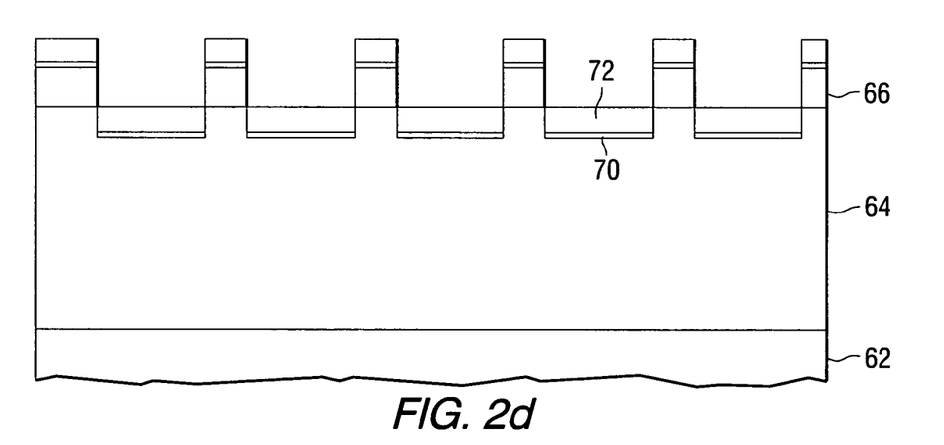
Figure 2E:
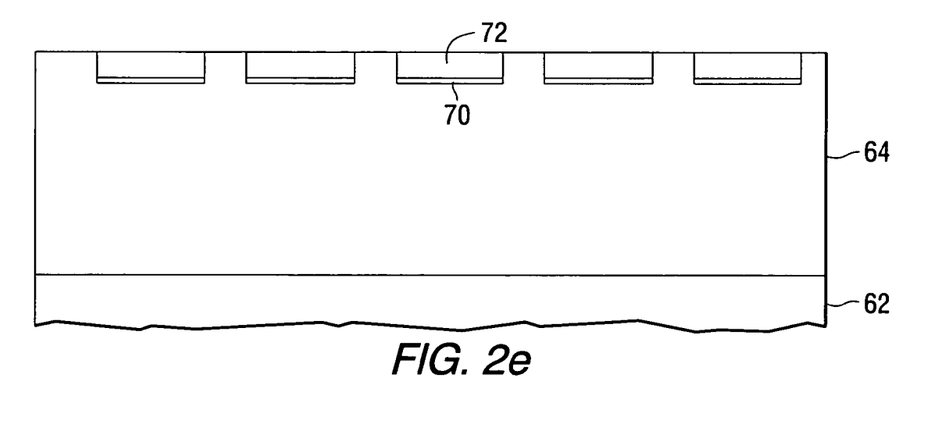
Figure 13:
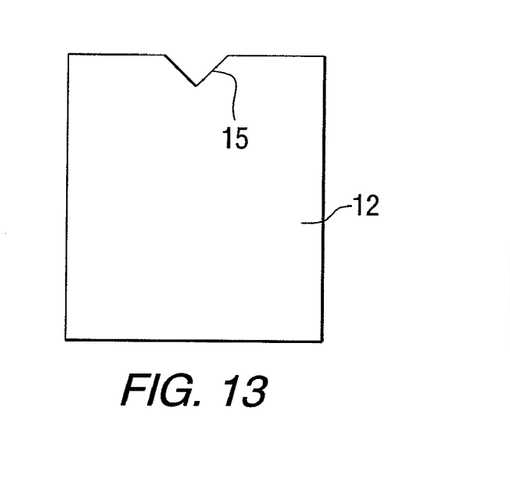
FIGS. 13 and 14 are cross sections of portions of magnetic recording discs constructed in accordance with aspects of the invention.
Figure 14:
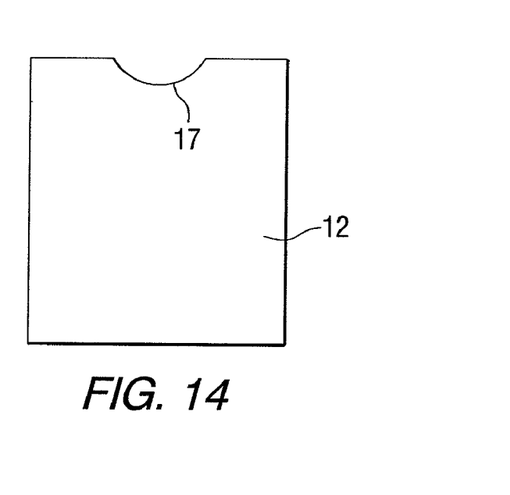

Referring to the drawings, FIG. 1 is a radial cross section of a portion of a discrete track media (DTM) magnetic recording disc 10 constructed in accordance with the invention. The DTM design uses an etched magnetic soft underlayer to define the recording zones. Disc 10 includes a magnetically soft underlayer 12, which can be formed on a substrate, not shown. A plurality of cavities 14, 16, 18, 20 and 22 are formed in a surface 24 of the magnetically soft underlayer. An interlayer 26, 28, 30, 32 and 34 is formed in the cavities. The interlayer can serve as a seed layer, or alternatively, one or more additional seed layers can be formed in the cavities. A plurality of tracks 36, 38, 40, 42 and 44 of a magnetically hard recording material are formed in the cavities. The top surfaces 46, 48, 50, 52 and 54 of the tracks are substantially coplanar with the surface 56 of the magnetically soft underlayer. An overcoat 58 is applied to the top of the disc. A write pole 60 is shown to be positioned adjacent to the surface of the disc and separated from the surface by an air bearing. The sides of the magnetically hard recording material form an angle θ with respect to the surface of the disc. In the example of FIG. 1, the angle θ is about 45°. However, it should be understood that the angle θ can range from 20 to 90°. Alternatively, the cavities can be in the form of grooves, indentations or depressions, and can have cross-sectional shapes such as parabolic or triangular, as in cavities 15 and 17 in FIGS. 13 and 14.

The magnetically soft underlayer should have a thickness of at least 150-200 nm and magnetic permeability >50. It can be formed as a laminated structure to suppress domain formation, which can result in an unwanted source of medium noise. The magnetically soft underlayer can be formed of, for example, permalloy, or other magnetically soft Fe, Co, and/or Ni alloys. The magnetically hard recording material should have a carefully engineered granular structure, with the single magnetic domain grains having controllable magnetic coupling with their neighbors. Normally, this intergranular magnetic coupling is kept weak in high performance magnetic media, and this is done by engineering controllable segregation of non-magnetic species at the grain boundaries. This granular magnetic material should have a magnetic anisotropy set high enough to protect the data storage stability against thermal and stray magnetic field perturbations, and the anisotropy orientation should be well controlled. The magnetically hard recording material can be formed of, for example, Co alloys containing for example one or more of Pt, Cr, Fe, Ni or B. The interlayer should provide the crystalline growth epitaxy for the hard magnetic film, and prevent interdiffusion of the hard and soft magnetic materials. The interlayer can be formed of, for example, Ta or Ru.

The $B_s$ of the soft underlayer [SUL] should be sufficiently high to avoid magnetic saturation from the high flux output of the perpendicular magnetic head pole, since the SUL is effectively part of the head structure (within the recording medium). The $B_s$ of the magnetic recording material is typically less than that of the SUL, and the motivation for raising it is to generate higher readback signal. However, the hard alloy is magnetically diluted compared to the SUL, so it necessarily will have lower $B_s$.

FIGS. 2a through 2e illustrate the fabrication of a magnetic storage medium in accordance with the invention. To fabricate the storage medium, a conventional perpendicular disc is fabricated up to the point of the soft underlayer (SUL). The structure of FIG. 2a includes a substrate 62 and a soft underlayer 64 positioned on the substrate. A resist layer 66 is applied to the surface of the SUL. The resist layer is patterned using, for example, either e-beam or optical lithography techniques, or is stamped from a master to produce the structure of FIG. 2b. Cavities 68 are then etched to a depth of about 20 nm in the SUL to produce the structure of FIG. 2c. The interlayer 70 (and an optional seed layer) and magnetic recording layer 72 are then deposited with a total depth approximately equal to the SUL etch depth to produce the structure of FIG. 2d. A lift off process removes the deposited material over the SUL region to produce the structure of FIG. 2e. The resist is then stripped, the disc is cleaned, and a protective overcoat is applied. A chemical mechanical polish step can be added in the process to remove any topography from the etch/deposition process. Stop layers can also be deposited to control the etching or polishing. For example, a CMP stop layer could be deposited on the SUL before patterning or on the magnetic layer to control planarization without damaging the magnetics. Variables to control in the process include the etch depth, etch wall angle, deposition depth, deposition conformality, and the overcoat thickness. The cavity width/track pitch duty cycle can be controlled to optimize disc storage capacity with respect to system signal-to-noise performance.

This process produces a disc with defined data and servo zones with no topography. That is, the disk surface should be substantially smooth so that the process does not introduce any disturbances to the flying head. Small disturbances, i.e. less than the fly height, can be tolerated for conventional air bearings. The protective overcoat serves as a sacrificial layer during planarization. It also forms a corrosion protection barrier and serves as the bonding surface for the lubricant.

State-of-the-art lithography techniques can produce feature sizes on the order of 20 nm. If the data track is 44 nm wide and the SUL space between the tracks is 20 nm, then the track density is 400 ktpi. At a 6 to 1 bit aspect ratio, this provides a storage density of almost 1 Tb/in$^2$.

Figure 3:
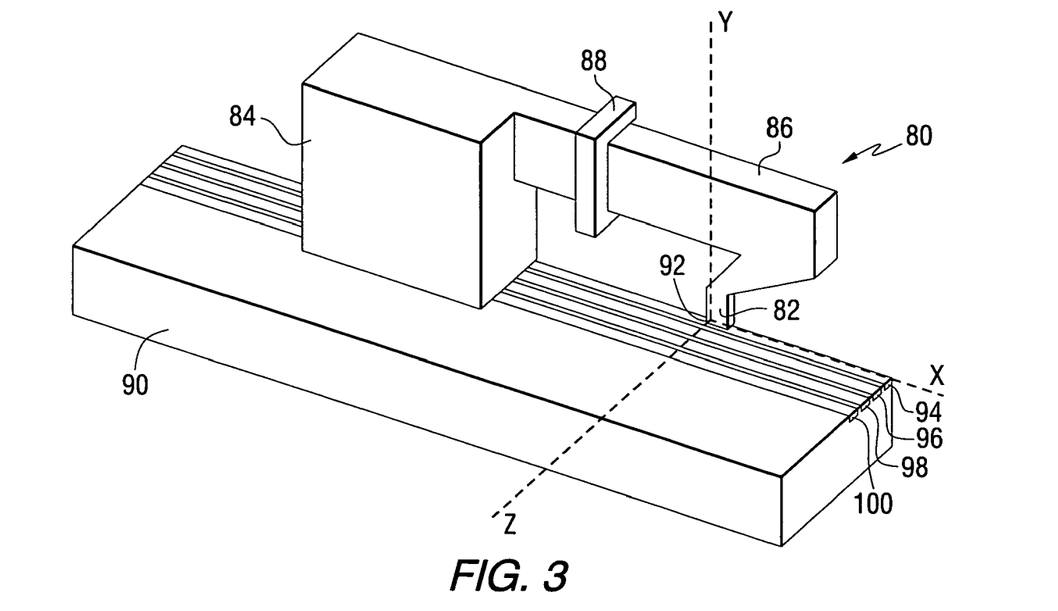
FIG. 3 is an isometric view of three-dimensional discrete track model.
Figure 4:
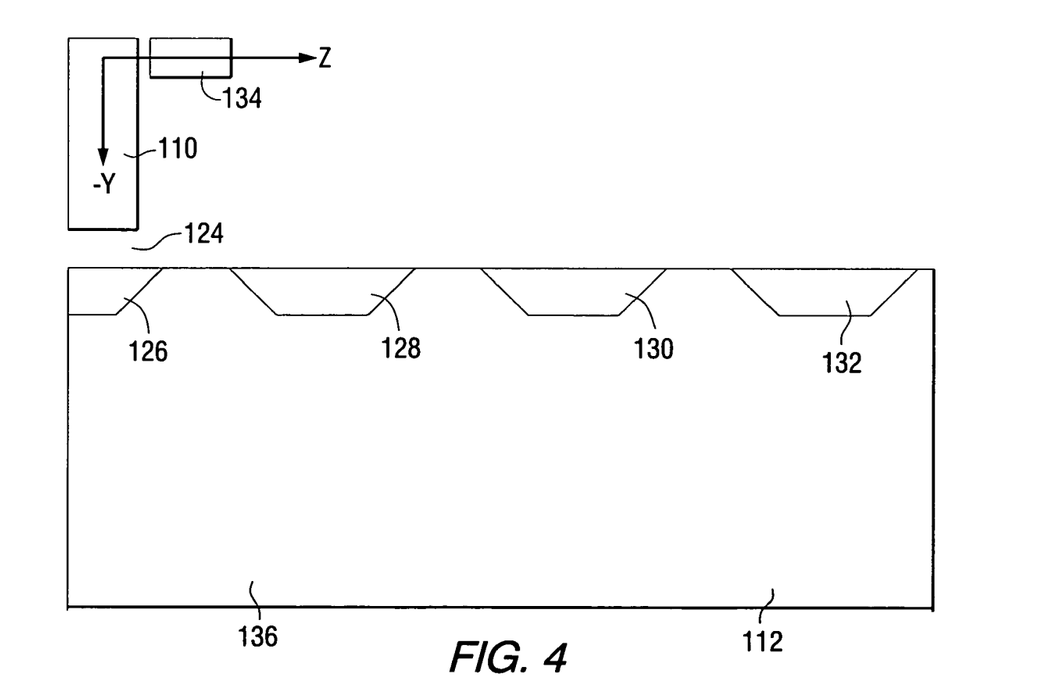
FIG. 4 is a schematic representation of a two-dimensional magnetostatics model showing a plane perpendicular to the media tracks.

Finite element magnetostatic and analog electrostatic modeling in two and three dimensions has been carried out to demonstrate the advantages of this discrete track medium design. FIGS. 3 and 4 depict the basic structure of the three-dimensional and two-dimensional models, respectively. FIG. 3 is an isometric view of the three-dimensional discrete track model. The model includes a recording head 80 having a write pole 82 and a return pole 84. A yoke 86 magnetically couples the write pole to the return pole. A coil 88 is positioned around the yoke to provide a magnetic field to the write pole. In the three-dimensional model, the back yoke is simplified from actual product heads in order to minimize the complexity of the model. The write pole is positioned adjacent to the surface of the disc 90 and separated from the disc surface by an air bearing 92. The disc includes a plurality of tracks 94, 96, 98 and 100. For the purposes of this description, track 94 is designated as track 0, track 96 is designated as track 1, track 98 is designated as track 2, and track 100 is designated as track 3. A mirror symmetry plane (XY) bisecting track 0 is employed to further reduce model size. In this example, the tracks have 90° sidewalls in the SUL, the track width (TW) is 50 nm, and the track pitch (TP) is 64 nm.

FIG. 4 is a schematic representation of a two-dimensional magnetostatics model showing a plane perpendicular to the media tracks. In FIG. 4, a write pole 110 is positioned adjacent to a disc 112 and separated from the disc surface by an air bearing 114. The disc includes a plurality of tracks 116, 118, 120 and 122. For the purposes of this description, track 116 is designated as track 0, track 118 is designated as track 1, track 120 is designated as track 2, and track 122 is designated as track 3. A coil 134 is positioned to supply magnetic flux for the write pole. The electrostatics model uses a structure identical to FIG. 4, except that the coil is absent. For the two-dimensional magnetostatics model, the flux must close in the y-z plane that is shown, and this results in unwanted (and unphysical) return flux for the large "z" coordinate values. A current value of 0.3 amperes is assumed to flow out of the page in the coil conductor. The write pole and the SUL 136 are represented with nonlinear B-H hysteresis curves, with the write pole having $B_s$~2.4T and the SUL having $B_s$~1.7T. The memory material was given a relative permeability of unity for the calculations.

For the electrostatic two-dimensional model, the scalar potential is set to +1 volt on the main pole (a conductor) and to 0 volts on the SUL (also a conductor). The memory material is represented as an insulator in this case.

Two-dimensional models enable more expedient surveys of parameter variations, and thus facilitate design optimization studies. Both two-dimensional magnetostatic and two-dimensional electrostatic analog models have been used to perform modeling of this invention. An electrostatic model allows the use of a simple scalar potential, while magnetostatics is restricted to the use of a vector potential approach (requiring current sources of field).

Magnetic and electric fields were sampled in these models as contour plots over a plane section of the model, or as line plots along a straight line path in the memory layer. The principal line plots of interest were along the z-axis transverse to the track direction, starting at the track centerline (z=0) and spanning 2-3 tracks. Usually, a line sample was done at the top surface of the memory layer and in its mid-plane. The mid-plane plots for the electrostatic model have the unphysical feature that, since the E-field vanishes inside the conducting SUL, no field information analogous to the B-field between tracks was available in the SUL interior.

The basic physical effect that has been observed, is the behavior of the magnetic flux density in the transverse plane. Because the recording material has a low permeability ($\mu$~1-2) compared to the SUL ($\mu$~100-500), one expects that flux emanating from the main writing pole would tend to shunt somewhat toward the inter-track regions where the SUL material reaches up to the surface of the disc. It would be expected that this effect could weaken somewhat the main writing field strength on Track 0, which is an undesirable result. However, the inter-track SUL material reaching the disk surface should shield the adjacent tracks somewhat from the writing flux, thus diminishing the leakage flux which has been observed to exacerbate side track erasure and thermal decay in perpendicular recording.

Several models have confirmed this effect, with the quantitative estimates varying somewhat owing to the expected differences in the nature of the boundary conditions reflected in the set-up of the different approaches. The different modeling approaches present tradeoffs in complexity and size of the models. For example, a three-dimensional magnetostatics model requires a relatively complicated representation of the writer yoke and its coil, and this consumes computational resources, resulting in the necessity of a somewhat coarser discretization in the media zone of primary interest below the writing pole. This yields plots that are less pleasing aesthetically, but the three-dimensional model offers the best representation of the true physical boundary conditions, and hence the potential for the best accuracy in the fields computed.

Figure 5:
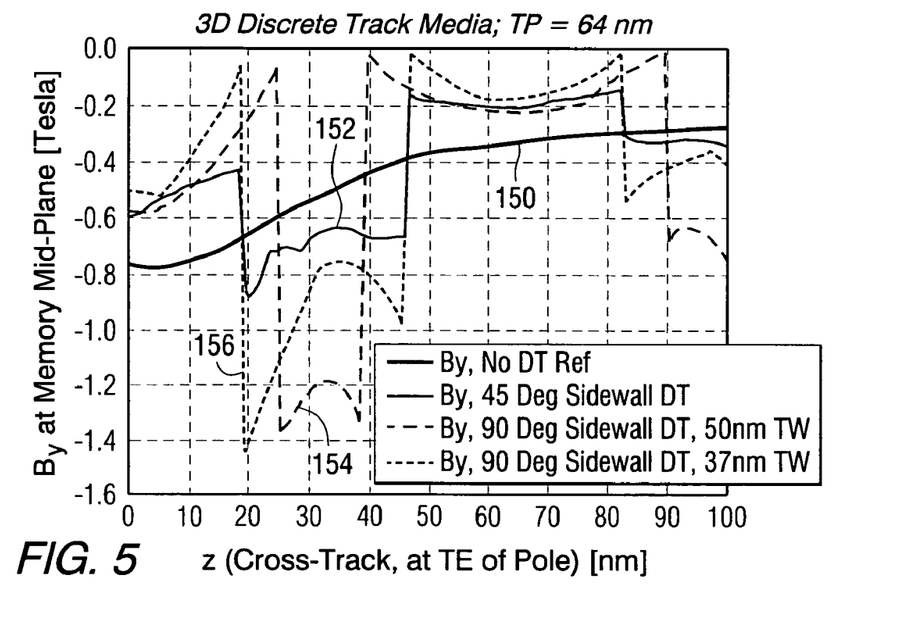
FIG. 5 is a graph showing a magnetic field component across the tracks from several three-dimensional models.

FIG. 5 shows line plots of the y-component of the magnetic field across the tracks from the three-dimensional model to illustrate the modulation of the B-field components across the discrete track structure. Field sampling is in the memory layer mid-plane. Line 150 represents $B_y$ for a disc without discrete tracks. Line 152 represents $B_y$ for a disc with discrete tracks having 45° sidewalls. Line 154 represents $B_y$ for a disc with discrete tracks having 90° sidewalls and a 50 nm track width. Line 156 represents $B_y$ for a disc with discrete tracks having 90° sidewalls and a 37 nm track width. FIG. 5 shows quantitative estimates of how the track 0 field is diminished relative to the no discrete track reference case, especially at the track edge. The field on track +1 (centered at z=64 nm) is roughly halved. For track 0, one redeeming feature which is not shown in these plots (but is shown in the two-dimensional line plots) is that the transverse field component $B_z$ peaks at the track edge. Thus, a Stoner-Wohlfarth effective switching field, defined as $$H_{eff} = [H_{parall}^{2/3} + H_{perp}^{2/3}]^{3/2},$$

which is helpful for rapid reversal of magnetization, will be more equalized across the track width.

Figure 6:
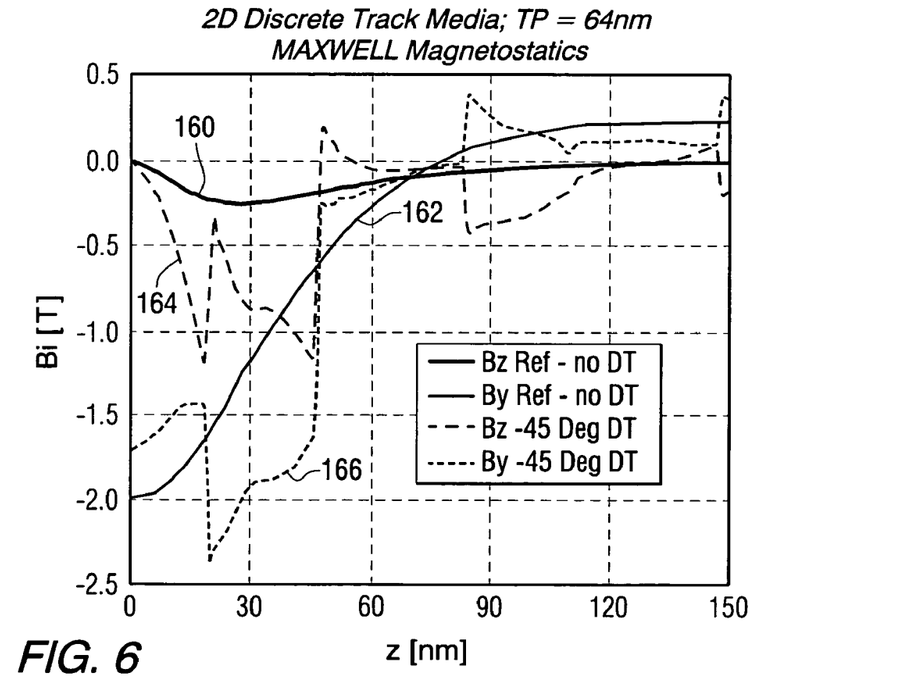
FIG. 6 is a graph showing magnetic field components across the tracks from a two-dimensional magnetostatics model.

Turning now to the two-dimensional magnetostatics cases, FIG. 6 shows comparative line plots of magnetic field components across the tracks for the two-dimensional magnetostatic model for the 45 degree sidewall media, compared to a reference case with no discrete tracks. Field sampling is in the memory layer mid-plane. Line 160 represents $B_z$ and line 162 represents $B_y$ for a disc without discrete tracks. Line 164 represents $B_z$ and line 166 represents $B_y$ for a disc with discrete tracks having 45° sidewalls. At large z these curves show a reversed sign return flux, an artifact of this two-dimensional modeling, which should be ignored. Nevertheless, the model shows the same behavior of the magnitude of the $B_y$ flux density, that is, it is reduced some 25-30% on track 0, and roughly halved on the further adjacent tracks. This seems to hold true even in the region where the sign of the side flux reversed in this model. The enhanced transverse field component $B_z$ in discrete track media tends to compensate the reduced $B_y$ on track 0 via the effective switching field.

Figure 7:
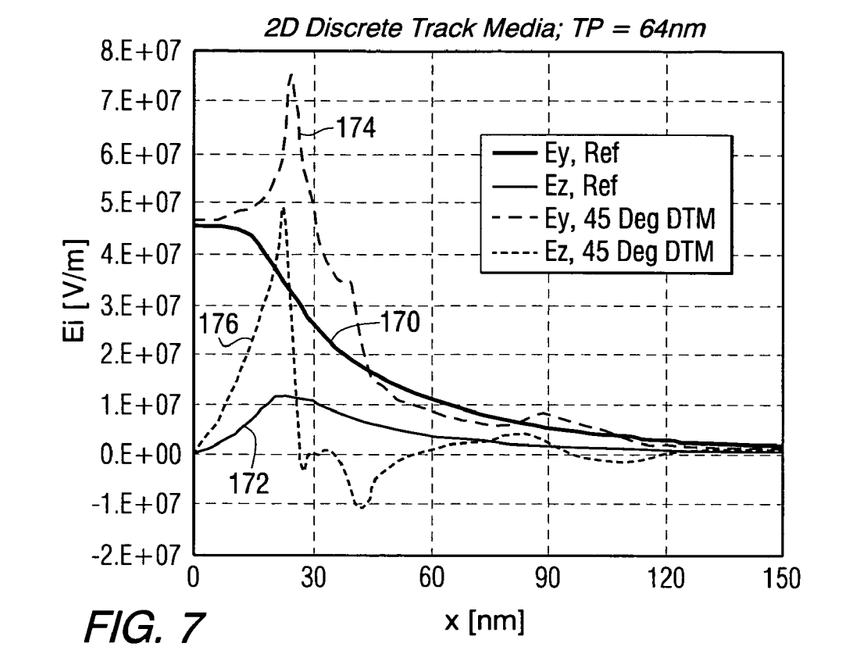
FIG. 7 is a graph showing electric field components across the tracks from the two-dimensional electrostatics model.

Finally, FIGS. 7 through 10 show the results from the two-dimensional electrostatics analog model. FIG. 7 shows line plots along the top of the memory layer for the two-dimensional electrostatics model for a disc with tracks having a nominal 45-degree sidewall. In FIG. 7, line 170 represents $E_y$ and line 172 represents $E_z$ for a disc without discrete tracks. Line 174 represents $E_y$ and line 176 represents $E_z$ for a disc with discrete tracks having 45° sidewalls.

Figure 8:
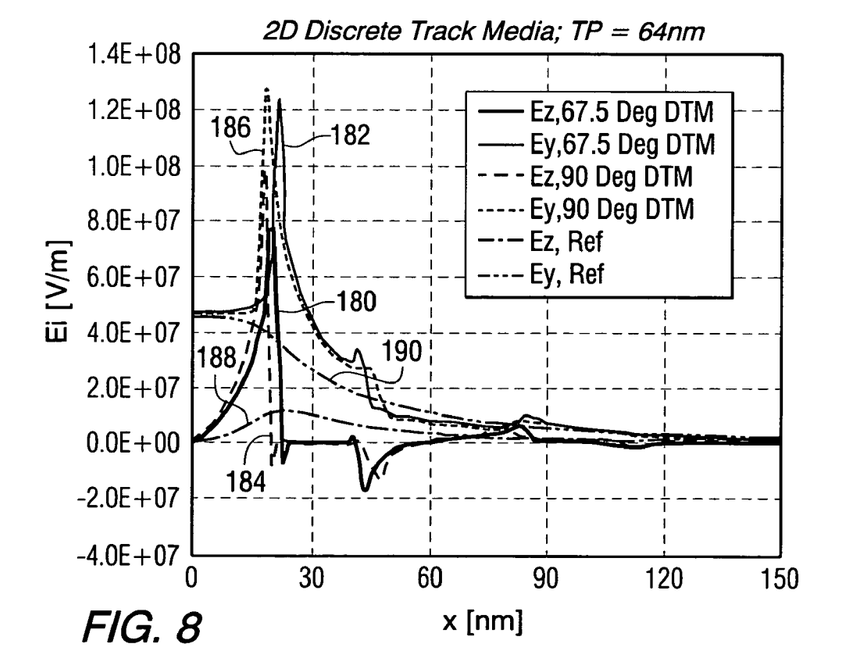
FIG. 8 is a graph showing electric field components across the tracks from the two-dimensional electrostatics model.

FIG. 8 shows electric field components for a two-dimensional discrete track model, comparing a varied track sidewall angle at a fixed track width/track pitch duty cycle and write pole width. In FIG. 8, line 180 represents $E_z$ and line 182 represents $E_y$ for a disc with discrete tracks having 67.5° sidewalls. Line 184 represents $E_z$ and line represents $E_y$ for a disc with discrete tracks having 45° sidewalls. Line 188 represents $E_z$ and line 190 represents $E_y$ for a disc without discrete tracks.

Figure 9:
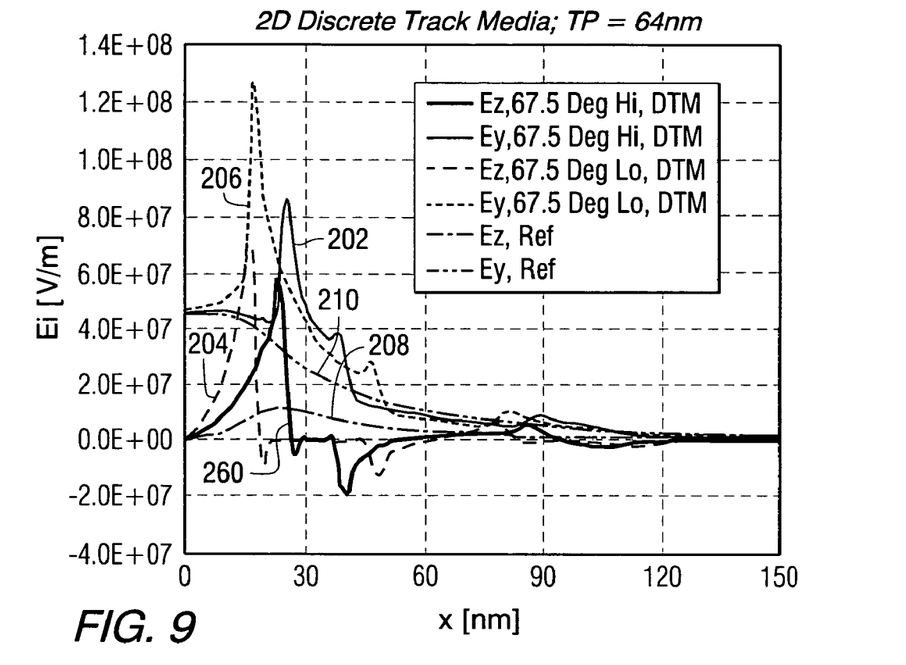
FIG. 9 is a graph showing electric field components across the tracks from the two-dimensional electrostatics model.

FIG. 9 shows electric field components for a two-dimensional discrete track model, comparing track width duty cycle for fixed write pole width of 35 nm. In FIG. 9, line 200 represents $E_z$ and line 202 represents $E_y$ for a disc with discrete tracks having 67.5° high sidewalls. Line 204 represents $E_z$ and line 206 represents $E_y$ for a disc with discrete tracks having 67.5° low sidewalls. Line 208 represents $E_z$ and line 210 represents $E_y$ for a disc without discrete tracks. "High" and "low" refers to the duty cycle track width/track pitch [or TW/TP], and the respective numerical values used were 0.70 and 0.45.

Figure 10:
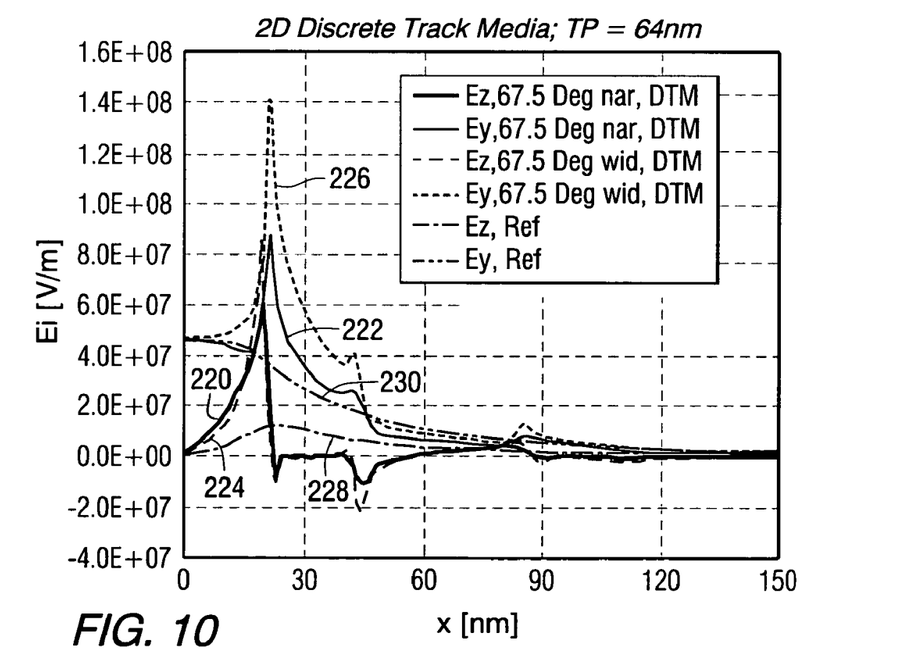
FIG. 10 is a graph showing electric field components across the tracks from the two-dimensional electrostatics model.

FIG. 10 shows electric field components for a two-dimensional discrete track model, comparing the effect of writing pole width variation. In FIG. 10, line 220 represents $E_z$ and line 222 represents $E_y$ for a disc with discrete tracks having 67.5° sidewalls and a write pole having a width of 25 nm. Line 224 represents $E_z$ and line 226 represents $E_y$ for a disc with discrete tracks having 67.5° sidewalls and a write pole having a width of 45 nm. Line 228 represents $E_z$ and line 230 represents $E_y$ for a disc without discrete tracks and a write pole having a width of 35 nm.

In this relatively simple finite element model, it was convenient to carry out a limited parameter survey to try to identify a more optimal configuration for discrete tracks. As noted earlier, in this electrostatics model, it was necessary to sample fields at the top surface of the memory layer to avoid the null field inside the conducting SUL. This resulted in sampling the somewhat artificial field spike at the track edge, especially as the track sidewall grew steeper. As noted earlier, the transverse field component would strongly contribute to the effective Stoner-Wohlfarth switching field here. This field peaking might tend to record tracks with a more sharply defined track edge (in addition to the effect of the discrete boundary of the memory material).

The magnetic intensity (H-vector) will be discontinuous upon entering the SUL (especially). In the modeling, the memory magnetic material was assumed to be linear (an approximation), and to have a relative permeability of 1.8. The SUL is nonlinear, with an initial permeability of ~200, and $B_s$~1.7-1.9T.

Figure 11:
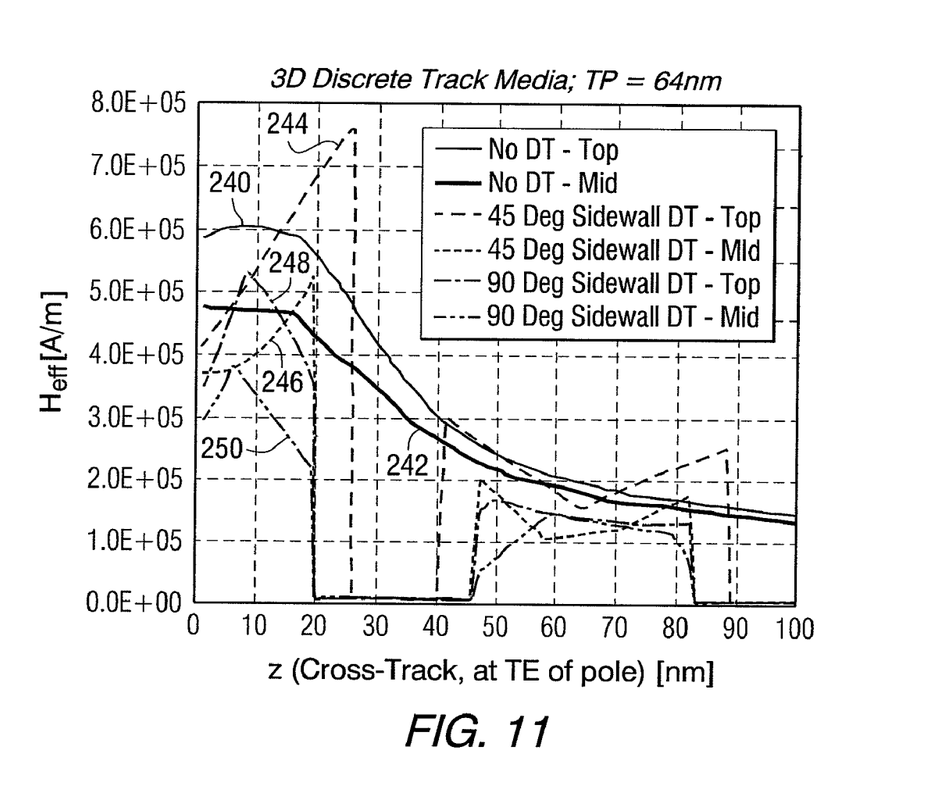
FIG. 11 is a graph of the magnetic intensity versus cross track direction for a three-dimensional discrete track media model.

FIG. 11 shows the magnetic intensity versus cross track direction for a three-dimensional discrete track media. In FIG. 11, 240 represents $H_{eff}$ at the top of a disc without discrete tracks and 242 represents $H_{eff}$ at the midpoint of a disc without discrete tracks. Line 244 represents $H_{eff}$ at the top of a disc with discrete tracks having a 45° sidewall, and 246 represents $H_{eff}$ at the midpoint of a disc with discrete tracks having a 45° sidewall. Line 248 represents $H_{eff}$ at the top of a disc with discrete tracks having a 90° sidewall, and 250 represents $H_{eff}$ at the midpoint of a disc with discrete tracks having a 90° sidewall. FIG. 11 clearly shows how $H_{eff}$ is negligible inside the high permeability SUL. A steeper sidewall gives a track edge field peak at the top surface of the memory layer.

The media of this invention would provide all of the claimed benefits of previous discrete track media designs, but also provides better field confinement. Magnetic modeling shows that the field is reduced on the neighbor tracks by a factor of ~2, while the on-track field amplitude is reduced by less than 10% when the effective field is considered. Further, there is an opportunity to fine-tune the details of the discrete track configuration to optimize the performance for any particular track density design. Refinements would include pole and SUL shaping to optimize the effective writing field on-track and minimizing the field at neighboring track locations.

Media constructed in accordance with this invention can provide improved read performance by improving SNR from a read wide architecture. It would permit the use of high sensitivity wider readers. A larger reader width tolerance can reduce the impact on the track misregistration or total media runout (TMR) budget. There would also be a reduced probability of reading old information, reduced track edge noise, and reduced nonlinear induced transition shift (NITS). The SUL walls may help shield some of this field by proving a localized return path.

Writing would be improved by reducing side writing with segmented or corrugated SUL, and less track edge curvature. If used in a heat assisted magnetic recording device, there would be reduced lateral heat flow.

Figure 12:
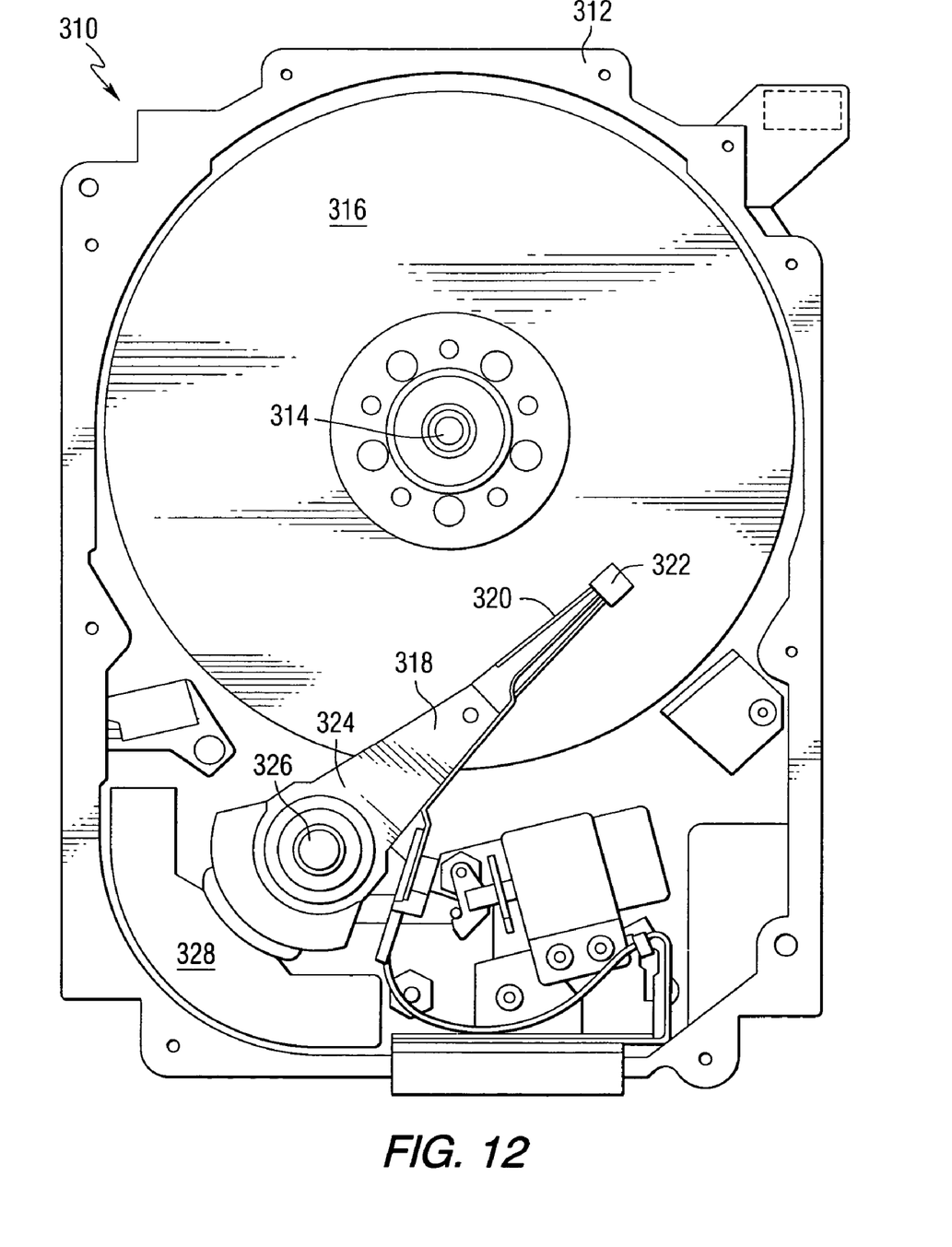
FIG. 12 is a pictorial representation of a disc drive that can include media constructed in accordance with this invention.

This invention also encompasses data storage devices that utilized the media. FIG. 12 is a pictorial representation of a disc drive 300 that can include media constructed in accordance with this invention. The disc drive includes a housing 312 (with the upper portion removed and the lower portion visible in this view) sized and configured to contain the various components of the disc drive. The disc drive includes a spindle motor 314 for rotating at least one discrete track storage medium 316 within the housing, in this case a magnetic disc. At least one arm 318 is contained within the housing 312, with each arm 318 having a first end 320 with a recording and/or reading head or slider 322, and a second end 324 pivotally mounted on a shaft by a bearing 326. An actuator motor 328 is located at the arm's second end 324, for pivoting the arm 318 to position the head 322 over a desired sector of the disc 16. The actuator motor 328 is regulated by a controller that is not shown in this view and is well-known in the art.

This invention provides a discrete track media that has the benefits of conventional DTM, addresses some of the manufacturability and tribology concerns, and alleviates the need for side shields in the recording head. While the invention has been described in terms of several examples, it will be apparent to those skilled in the art that various changes can be made to the disclosed examples without departing from the scope of the invention as set forth in the following claims.

What is claimed is:

1. A magnetic recording medium comprising:
    a magnetically soft underlayer having a plurality of cavities in a planar surface thereof; and
    a magnetic recording material in the cavities, wherein material of the magnetically soft underlayer lies under the magnetic recording material and a top surface of the magnetic recording material in the cavities is substantially coplanar with the planar surface of the soft underlayer between the cavities.

2. The magnetic recording medium of claim 1, wherein sidewalls of the cavities are positioned at an angle ranging from 20° to 90° with respect to the surface of the soft underlayer.

3. The magnetic recording medium of claim 1, wherein the cavities have a rectangular, triangular, parabolic or trapezoidal cross-sectional shape.

4. The magnetic recording medium of claim 1, further comprising:
    an overcoat layer on the surface of the magnetic recording material and the surface of the soft underlayer.

5. The magnetic recording medium of claim 1, wherein the magnetic recording material comprises a Co alloy including at least one of:
    Pt, Cr, Fe, Ni or B.

6. The magnetic recording medium of claim 1, wherein the soft underlayer comprises at least one of:
    permalloy, or an alloy of Fe, Co and/or Ni.

7. The magnetic recording medium of claim 1, further comprising:
    an interlayer positioned in the cavities between the magnetic recording material and the magnetically soft underlayer.

8. The magnetic recording medium of claim 7, wherein the interlayer comprises at least one of:
    Ta or Ru.

9. The magnetic recording medium of claim 1, wherein the recording medium has a track width to track pitch duty cycle in the range of 0.45 to 0.7.

10. The magnetic recording medium of claim 1, wherein the magnetic saturation of the magnetically soft underlayer is larger than the magnetic saturation of the magnetic recording material.

11. The magnetic recording medium of claim 1, wherein the magnetic recording material forms a plurality of tracks in the magnetic recording medium.

12. A data storage system comprising:
    a storage medium;
    a recording head positioned adjacent to the storage medium; and
    the storage medium including a magnetically soft underlayer having a plurality of cavities in a planar surface thereof, and a magnetic recording material in the cavities, wherein material of the magnetically soft underlayer lies under the magnetic recording material and a top surface of the magnetic recording material in the cavities is substantially coplanar with the planar surface of the soft underlayer between the cavities.

13. The data storage system of claim 12, wherein the cavities have a rectangular, triangular, parabolic or trapezoidal cross-sectional shape.

14. The data storage system of claim 12, further comprising:
    an overcoat layer on the surface of the magnetic recording material and the surface of the soft underlayer.

15. The data storage system of claim 12, wherein the magnetic recording material comprises a Co alloy including at least one of:
    Pt, Cr, Fe, Ni or B.

16. The data storage system of claim 12, wherein the soft underlayer comprises at least one of:
    permalloy, or an alloy of Fe, Co and/or Ni.

17. The data storage system of claim 12, further comprising:
    an interlayer positioned in the cavities between the magnetic recording material and the magnetically soft underlayer.

18. The data storage system of claim 17, wherein the interlayer comprises at least one of:
    Ta or Ru.

19. The data storage system of claim 12, wherein the storage medium has a track width to track pitch duty cycle in the range of 0.45 to 0.7.

20. The data storage system of claim 12, wherein the magnetic saturation of the magnetically soft underlayer is larger than the magnetic saturation of the magnetic recording material.

21. The data storage system of claim 12, wherein sidewalls of the cavities are positioned at an angle ranging from 20° to 90° with respect to the surface of the soft underlayer.

22. The data storage system of claim 12, wherein the magnetic recording material forms a plurality of tracks in the magnetic recording medium.

* * * * *

UNITED STATES PATENT AND TRADEMARK OFFICE
CERTIFICATE OF CORRECTION

PATENT NO. : 7,394,622 B2  Page 1 of 1
APPLICATION NO. : 11/005819
DATED : July 1, 2008
INVENTOR(S) : Edward Charles Gage et al.

It is certified that error appears in the above-identified patent and that said Letters Patent is hereby corrected as shown below:

Detailed Description of the Invention

Column 6, Line 9 should read
Line 184 represents $E_z$ and line <u>186</u> represents $E_y$ for a disc with discrete tracks having 45° sidewalls.

Signed and Sealed this

Twenty-first Day of July, 2009

JOHN DOLL
*Acting Director of the United States Patent and Trademark Office*